United States Patent
Baca et al.

(10) Patent No.: US 9,272,947 B2
(45) Date of Patent: Mar. 1, 2016

(54) GLASS ARTICLE HAVING ANTIREFLECTIVE LAYER AND METHOD OF MAKING

(75) Inventors: Adra Smith Baca, Rochester, NY (US); Daniel Aloysius Nolan, Corning, NY (US); Odessa Natalie Petzold, Elmira, NY (US); Mark Alejandro Quesada, Horseheads, NY (US); Wageesha Senaratne, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 701 days.

(21) Appl. No.: 13/440,183

(22) Filed: Apr. 5, 2012

(65) Prior Publication Data

US 2012/0281292 A1 Nov. 8, 2012

Related U.S. Application Data

(60) Provisional application No. 61/481,429, filed on May 2, 2011.

(51) Int. Cl.
| | |
|---|---|
| G02B 1/11 | (2015.01) |
| C03C 17/00 | (2006.01) |
| G02B 1/113 | (2015.01) |
| G02B 1/118 | (2015.01) |

(52) U.S. Cl.
CPC .............. *C03C 17/007* (2013.01); *G02B 1/113* (2013.01); *G02B 1/118* (2013.01); *C03C 2217/42* (2013.01); *C03C 2217/44* (2013.01); *C03C 2217/732* (2013.01)

(58) Field of Classification Search
CPC ..................... G02B 1/11; G02B 1/118; G02B 5/02–5/0205; G02B 5/0242; G02B 5/0268; G02B 5/206; C03C 17/007; C03C 2217/42; C03C 2217/43–2217/44; C03C 2217/73–2217/732

See application file for complete search history.

(56) References Cited

U.S. PATENT DOCUMENTS

| | | | |
|---|---|---|---|
| 6,251,523 B1 | 6/2001 | Takahashi et al. | 428/428 |
| 6,444,495 B1 | 9/2002 | Leung et al. | 438/118 |
| 6,653,718 B2 | 11/2003 | Leung et al. | 257/634 |
| 7,709,551 B2 | 5/2010 | Kang et al. | 522/83 |
| 2004/0237590 A1 | 12/2004 | Sakoske et al. | 65/60.5 |
| 2006/0074172 A1 | 4/2006 | Yang et al. | |

(Continued)

FOREIGN PATENT DOCUMENTS

| | | |
|---|---|---|
| CN | 1241232 | 2/2006 |
| CN | 101257980 | 9/2008 |

(Continued)

OTHER PUBLICATIONS

International Search Report, Form PCT/ISA/206, European Patent Office, Dated Oct. 5, 2012.
Incomplete International Search Report, Form PCT/ISA/206, European Patent Office, Dated Aug. 6, 2012.

(Continued)

*Primary Examiner* — Derek S Chapel
(74) *Attorney, Agent, or Firm* — Payal A. Patel

(57) ABSTRACT

Durable antireflective coatings and glass articles having such coatings are described herein. The antireflective coatings generally include a layer of nominally hexagonally packed nanoparticles that are partially embedded either in a surface of the glass article or in a binder that is on the surface of the glass article. Methods of making the antireflective coatings or layers and glass articles having such antireflective layers are also described.

20 Claims, 10 Drawing Sheets

(56) References Cited

U.S. PATENT DOCUMENTS

| | | | |
|---|---|---|---|
| 2008/0289685 A1 | 11/2008 | Chen et al. | |
| 2008/0299348 A1 | 12/2008 | Liu | 428/98 |
| 2009/0071532 A1 | 3/2009 | Chan et al. | |
| 2010/0118397 A1* | 5/2010 | Powell et al. | 359/452 |
| 2011/0165393 A1 | 7/2011 | Bayne et al. | |

FOREIGN PATENT DOCUMENTS

| | | |
|---|---|---|
| CN | 101384923 | 3/2009 |
| CN | 101734865 | 6/2010 |
| CN | 101858995 | 10/2010 |
| EP | 2241909 A2 | 10/2010 |
| EP | 2537798 A1 | 12/2012 |
| JP | 07092305 | 10/2003 |
| KR | 10-2012-0119020 | 10/2012 |
| WO | 2004108587 | 12/2004 |
| WO | 2007093339 A1 | 8/2007 |
| WO | 2009074712 A1 | 6/2009 |

OTHER PUBLICATIONS

"Antireflection structured surfaces for the infrared spectral region"; Raguin et al; Applied Optics; vol. 32, No. 7; Mar. 1, 1993; p. 1154-1167.

"Reflective properties of nanoparticle-arrayed surfaces"; Liu, et al; Thin Solid Films 518 (2010); 6015-6021.

Patent Cooperation Treaty International Notification of Transmittal of the International Preliminary Report of Patentability Report on Patentability (Chapter I of the Patent Cooperation Treaty) of the International Searching Authority, international application No. PCT/US2012/035073: mailing date Nov. 14, 2013, 11 pages.

Patent Cooperation Treaty International Notification of Transmittal of the International Search Report of the International Searching Authority, international application No. PCT/US2012/066920: mailing date Oct. 5, 2012, 7 pages.

Application No. 201280021563.8, Chinese Search Report, May 25, 2017.

Wang Feng, Decoration Materials Silicate.

English translation of KR 10-2012-0119020, 7 pgs.

* cited by examiner

GLASS ARTICLE HAVING ANTIREFLECTIVE LAYER AND METHOD OF MAKING

This application claims the benefit of priority under 35 USC §119 of US Provisional Application Ser. No. 61/481,429 filed on May 2, 2011 the content of which is relied upon and incorporated herein by reference in its entirety.

BACKGROUND

The disclosure relates to an antireflective layer. More particularly, the disclosure relates to a glass substrate having an antireflective layer.

Antireflective coatings are typically applied to display screens or windows in a variety of electronic devices, such as communication or entertainment devices, and the like. Such antireflective surfaces take the form of adhesive films that are attached to the screen or window. These adhesive films are sometimes coated with additional multiple index interference coatings that prevent reflections from the screen or window. Air sometimes is trapped between the display and the film during the attachment process, thereby creating air pockets that disrupt viewing of the display. Moreover, such films are easily scratched during use and lack the durability needed to withstand prolonged use.

BRIEF SUMMARY

Durable antireflective coatings and glass articles having such coatings are provided. The antireflective coatings include a layer of nominally or substantially hexagonally packed nanoparticles that are disposed on or at least partially embedded in a surface of the glass article (e.g., by allowing the nanoparticles to sink into the surface of the glass during heating or by providing a binder that secures the nanoparticles to the surface of the glass wherein at least a portion of the nanoparticles are not contained within the binder). Methods of making the antireflective coatings or layers and glass articles having such antireflective layers are also provided.

One type of transparent glass article can include a glass substrate and an antireflective layer having a total reflectance of less than about 2% at wavelengths in a range from about 450 nanometers (nm) to about 1000 nm disposed on a surface of the glass substrate. The antireflective layer can include a plurality of nominally hexagonally packed nanoparticles disposed in a monolayer on the surface of the glass substrate, such that at least a portion of the plurality of nominally hexagonally packed nanoparticles are separated from each other by a gap. The total reflectance is that of the antireflective layer itself, and does not include any reflection contribution from the glass substrate.

In certain implementations of this type of transparent glass article, at least a portion (i.e., some or all) of the plurality of nominally hexagonally packed nanoparticles is partially embedded in the surface of the glass substrate. Each nanoparticle of the at least the portion of the plurality of nominally hexagonally packed nanoparticles can be embedded in the surface of the glass substrate to a depth of less than about one half of its diameter.

In other implementations of this type of transparent glass article, the transparent glass article can further include an inorganic and/or organo-silicon binder disposed on the surface of the glass substrate, such that at least a portion of the plurality of nominally hexagonally packed nanoparticles is partially embedded in the inorganic and/or organo-silicon binder. Each nanoparticle of the at least the portion of the plurality of nominally hexagonally packed nanoparticles can be embedded in the inorganic and/or organo-silicon binder to a depth of less than about one half of its diameter. The inorganic and/or organo-silicon binder can be chosen from a silsesquioxane, a methyl siloxane, a methyl phenyl siloxane, a phenyl siloxane, an alkali metal silicate, an alkali metal borate, or a combination thereof.

In certain transparent glass articles of this type, the plurality of nominally hexagonally packed nanoparticles has an average diameter of about 80 nm to about 200 nm.

The various transparent glass articles of this type can exhibit a variety of physical attributes. For example, the antireflective layer can have a transmission haze of less than about 1%. Similarly, the glass substrate can be chemically strengthened by ion exchange to result in the surface having a compressive layer under compressive stress that extends from the surface to a depth within in the glass, wherein the compressive stress is at least 350 megaPascals (MPa) and the depth of layer of the compressive layer is at least 20 micrometers ($\mu$m). It is possible for the compressive stress and depth of layer to be at least 500 MPa and at least 60 $\mu$m, respectively. Also, the transparent glass article, when placed in front of a display comprising a plurality of pixels, can exhibit no sparkle. In addition, the antireflective layer can have a reflectance after 5,000 wipes that varies by less than about 20% from an initial reflectance of the antireflective layer measured before wiping. Still further, the antireflective layer can have a hardness ranging from HB up to 9H, as will be defined below. In certain cases, the transparent glass article can exhibit more than one of these physical attributes.

One type of antireflective layer that is disposable on a surface of a glass substrate can include a binder and a plurality of nanoparticles partially embedded in the binder. The plurality of nanoparticles can benominally hexagonally packed in a monolayer on the surface of the glass substrate, such that adjacent nanoparticles are separated from each other by a gap. The antireflective layer itself can have a total reflectance of less than about 2% at wavelengths in a range from about 450 nm to about 1000 nm.

In certain implementations of this type of antireflective layer, each of the plurality of nanoparticles can have a diameter, and each of the plurality of nanoparticles can be embedded in the binder to a depth of less than about one half of the diameter. It is also possible for each of the plurality of nanoparticles to be spherical, aspherical, ellipsoidal, or polygonal. In certain cases, each of the plurality of nanoparticles can have a diameter in a range from about 80 nm to about 200 nm.

The various antireflective layers of this type can exhibit a variety of physical attributes. For example, the antireflective layer can have a transmission haze of less than about 1%. Also, the antireflective layer, when placed in front of a display comprising a plurality of pixels, can exhibit no sparkle. In addition, the antireflective layer can have a reflectance after 5,000 wipes that varies by less than about 20% from an initial reflectance of the antireflective layer measured before wiping. Still further, the antireflective layer can have a hardness ranging from HB up to 9H, as will be defined below. In certain cases, the antireflective layer can exhibit more than one of these physical attributes.

One type of method of making an antireflective layer on a glass substrate can include self-assembling a plurality of nanoparticles in a nominally hexagonally packed monolayer on the surface of the glass substrate, wherein at least a first portion of the plurality of nominally hexagonally packed nanoparticles are separated from each other by a gap. This method also includes partially embedding at least a second portion of the plurality of nanoparticles in the surface of the glass substrate or in a binder to form the antireflective layer, where the binder is an inorganic and/or organo-silicon binder, and where the antireflective layer has a reflectance of less than about 2% at wavelengths in a range from about 450 nm to about 1000 nm.

In certain implementations of this type of method, self-assembling the plurality of nanoparticles can entail applying a dispersion comprising the plurality of nanoparticles to the surface of the glass substrate by spin-coating, dip-coating, gravure printing, doctor blading, spray-coating, slot die coating, or a combination thereof.

In some implementations of this type of method, partially embedding the at least the second portion of the plurality of nanoparticles in the surface of the glass substrate comprises heating the glass substrate and/or the at least the second portion of the plurality of nanoparticles at a temperature above an anneal point of the glass substrate such that a portion of the nanoparticles of the at least the second portion of the plurality of nanoparticles sinks into the surface of the glass. In other implementations of this type of method, partially embedding the at least the second portion of the plurality of nanoparticles in the inorganic and/or organo-silicon binder comprises disposing the inorganic and/or organo-silicon binder on the surface of the glass substrate and into spaces between the nanoparticles of the at least the second portion of the plurality of nanoparticles. In these latter implementations, each nanoparticle of the at least the second portion of the plurality of nanoparticles can be embedded in the inorganic and/or organo-silicon binder to a depth of less than about one half of its diameter.

This type of method can further include ion exchanging the glass substrate such that the surface of the glass substrate has a compressive layer under compressive stress that extends from the surface to a depth within in the glass substrate, wherein the compressive stress is at least 350 MPa and the depth of layer of the compressive layer is at least 20 μm. It is possible for the ion exchanging to result in a compressive stress and depth of layer of at least 500 MPa and at least 60 μm, respectively. In certain cases, the ion exchanging is performed after partially embedding the at least the second portion of the plurality of nanoparticles in the surface of the glass substrate or in the binder.

This type of method can also include a step involving etching the surface of the glass substrate, which can be before or after the self-assembling step.

This type of method of making an antireflective layer on a glass substrate can result in the production of a transparent glass article that can exhibit a variety of physical attributes. For example, the antireflective layer can have a transmission haze of less than about 1%. Also, the transparent glass article, when placed in front of a display comprising a plurality of pixels, can exhibit no sparkle. In addition, the antireflective layer can have a reflectance after 5,000 wipes that varies by less than about 20% from an initial reflectance of the antireflective layer measured before wiping. Still further, the antireflective layer can have a hardness ranging from HB up to 9H, as will be defined below. In certain cases, this type of method can result in the production of a transparent glass article that can exhibit more than one of these physical attributes.

Another type of method of making an antireflective layer on a glass substrate can include self-assembling a plurality of nanoparticles in a nominally hexagonally packed monolayer on a surface of the glass substrate such that adjacent nanoparticles are separated from each other by a gap, and partially embedding the plurality of nanoparticles in the surface to form the antireflective layer, wherein the antireflective layer itself has a total reflectance of less than about 2% at wavelengths in a range from about 450 nm to about 1000 nm.

Yet another type of method of making an antireflective layer on a glass substrate can include self-assembling a plurality of nanoparticles in a nominally hexagonally packed monolayer on a surface of the glass substrate such that adjacent nanoparticles are separated from each other by a gap, and partially embedding the plurality of nanoparticles in an inorganic and/or organo-silicon binder on the surface to form the antireflective layer, wherein the antireflective layer has a total reflectance of less than about 2% at wavelengths in a range from about 450 nm to about 1000 nm.

These and other aspects, advantages, and salient features will become apparent from the following detailed description, the accompanying drawings, and the appended claims.

DETAILED DESCRIPTION

Figure 1:
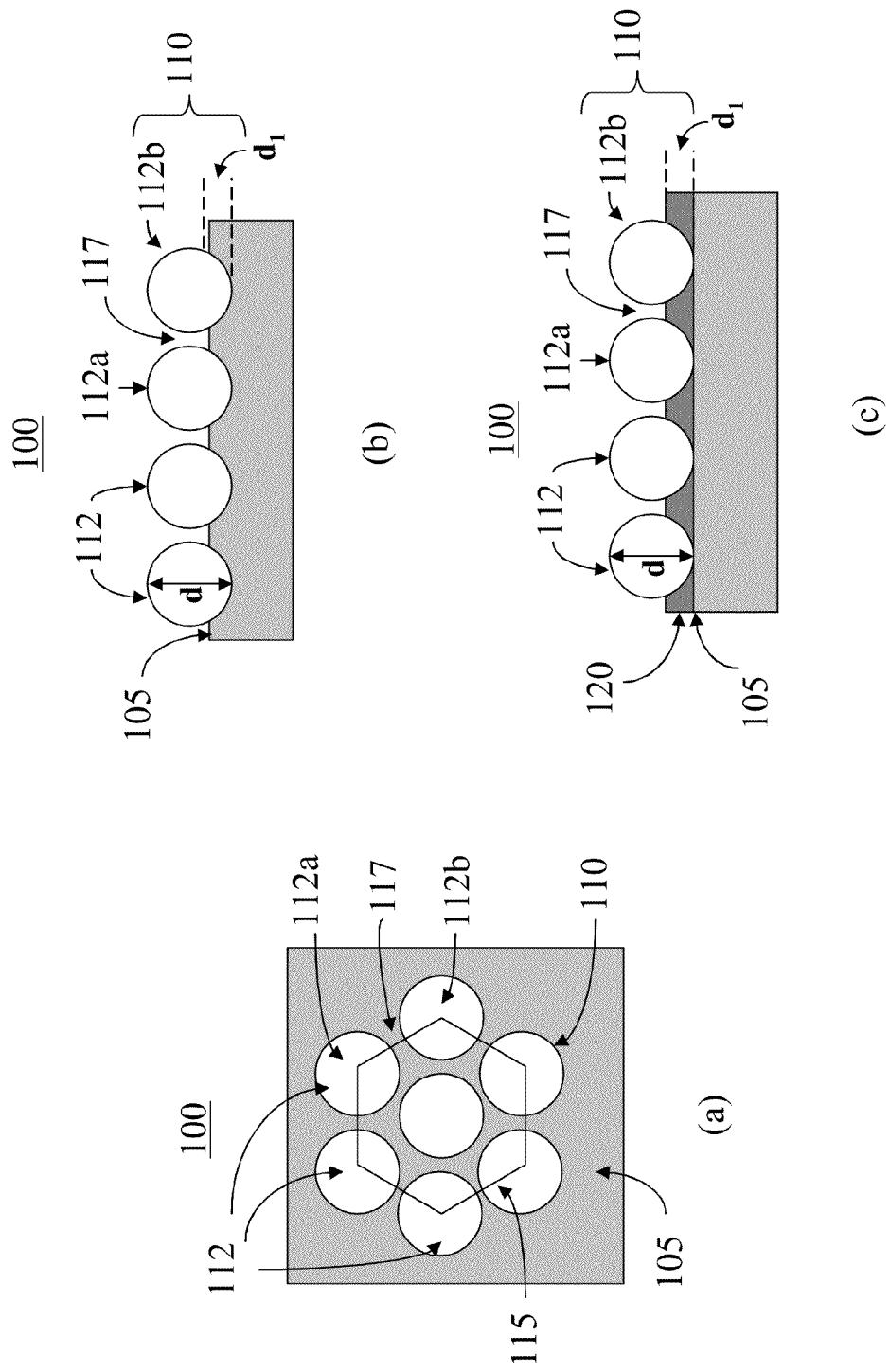
FIG. 1a is a schematic view of a glass article having an antireflective layer.
FIG. 1b is a schematic view of a glass article having an antireflective layer.
FIG. 1c is a second schematic view of a glass article having another antireflective layer.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range and any ranges therebetween. As used herein, the indefinite articles "a," "an," and the corresponding definite article "the" mean "at least one" or "one or more," unless otherwise specified.

Referring to the drawings, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As stated above, antireflective layers and transparent glass articles having antireflective layers disposed on a (i.e., at least one) surface of a glass substrate are provided. As used herein, the terms "antireflective" or "antireflection" generally refer to the ability of the layer or article to resist specular reflectance of light that is incident thereto across a specific spectrum of interest.

Although the antireflective layers can be disposed on more than one surface of a glass substrate or article, for convenience (and without any intent for limitation thereto), the figures and description thereof provided below will refer to glass articles having an antireflective layer disposed on one surface.

A schematic top view of glass article or substrate 100 having an antireflective layer 110 is shown in FIG. 1a, while FIGS. 1b and 1c are cross-sectional side views of a glass article 100 having an antireflective layer 110. A plurality of nanoparticles 112 is disposed on or at least partially embedded in a surface 105 of glass article 100. In some aspects, nanoparticles 112 are arranged in a substantially or nominally hexagonally packed geometry or array 115 (FIG. 1a) in a monolayer on surface 105. As used herein, the terms "substantially hexagonally packed" or "nominally hexagonally packed" refer to the packing arrangement of the nanoparticles on the surface of the glass substrate. In such arrangements, an overwhelming majority of the nanoparticles on the surface will be arranged in a so-called "hexagonal close-packing" pattern (i.e., where a given particle has six nearest neighbors arranged in the shape of a hexagon surrounding the particle). In certain implementations, at least 80 percent (%) of the nanoparticles will be arranged in a hexagonal close-packing pattern. In other situations, at least 90% of the nanoparticles are arranged in a hexagonal close-packing pattern.

Adjacent nanoparticles (e.g., 112a, 112b in FIGS. 1a-c) may be separated from each other by a gap 117. As used herein, the term "gap" refers to the interparticle separation or spacing between adjacent nanoparticles, and is expressed in terms of the average distance between the mean diameters (d) of individual nanoparticles 112. As used herein, the standard meaning of the term "diameter" is not limited to just the diameter of a perfectly spherical particle, but also refers to the mean particle size of the nanoparticles as determined by size measurement techniques that are known in the art, the major axis or dimension of non-spherical nanoparticles, and the diameter of the smallest sphere that would encompass or enclose such non-spherical particles.

Nanoparticles 112 may be deposited on surface 105 by self-assembly techniques such as spin-coating, dip-coating, or the like with a dispersion comprising nanoparticles 112. In some embodiments, the antireflective layer 110 has a reflectance of less than about 1% and, in some embodiments, less than about 1.5% for radiation having wavelength λ in a range from about 450 nm to about 700 nm. Low reflectance in this wavelength range is particularly useful for display applications. In other embodiments, antireflective layer 110 has a reflectance of less than about 2% for wavelengths λ ranging from about 450 nm to about 1000 nm. Low reflectance in the 450-1000 nm range is particularly useful for photovoltaic applications.

Nanoparticles 112 are durable, resistant to abrasion, and have a low index of refraction that can approximate that of glass substrate 105. In some embodiments, nanoparticles 112 comprise polymeric particles, inorganic oxides or fluorides (e.g., of cerium, zirconium, aluminum, titanium, magnesium, silicon, or the like), or the like, combinations thereof, or mixtures thereof. Nanoparticles 112 may be essentially spherical in shape; (i.e., nanoparticles 112 may be perfectly spherical, nearly spherical, ellipsoidal with both axes approximately equal to each other, or polygonal, as long as the overall shape approximates that of a sphere). In other embodiments, nanoparticles 112 can be conical or approximately conical in shape. Nanoparticles 112 can have a diameter in a range from about 80 nm to about 200 nm and, in some embodiments, from about 80 nm to about 180 nm.

Figure 2:
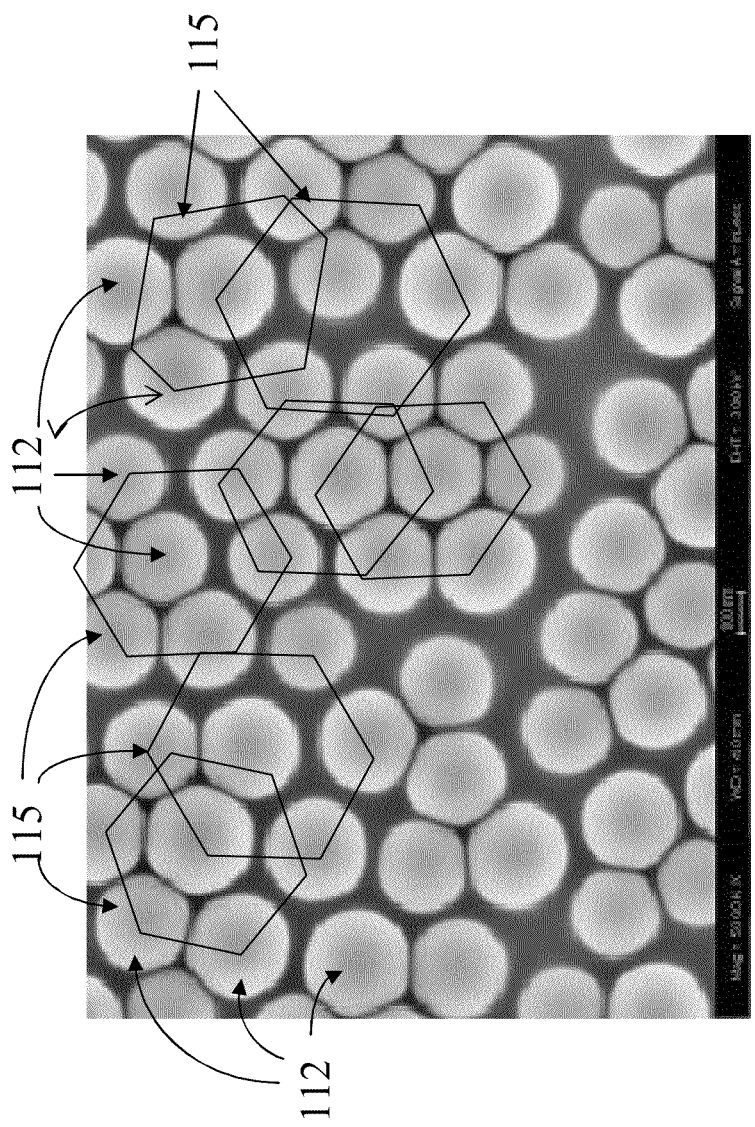
FIG. 2 is a scanning electron microscope (SEM) image of a top view of a surface of a glass article in which nanoparticles have been embedded in the surface of the glass article.

In some embodiments, nanoparticles 112 are partially embedded in surface 105 so as to secure, bond, or adhere nanoparticles 112 to surface 105 and glass article 100, thus providing antireflective layer 110 with durability and scratch resistance. Nanoparticles 112 may, in some embodiments, be partially embedded in surface 105 by heating glass article or substrate 100 to a temperature above the annealing point of the underlying glass, causing the surface 105 of the glass article 100 to soften and allow nanoparticles 112 to partially sink into—and embed in—the surface 105 of the glass article 100, as schematically shown in FIG. 1b. FIG. 2 is a scanning electron microscope (SEM) image of a top view of a surface of a glass article 100 in which the nanoparticles 112 have been embedded in the surface 105 of the glass article 100 by heating the glass article 100 to a temperature above its anneal point and allowing the nanoparticles 112 to sink into the surface 105 of the glass article 100. As can be seen in the SEM image, nanoparticles 112 have self-assembled into a nominally hexagonally packed geometry or array 115.

Figure 3:
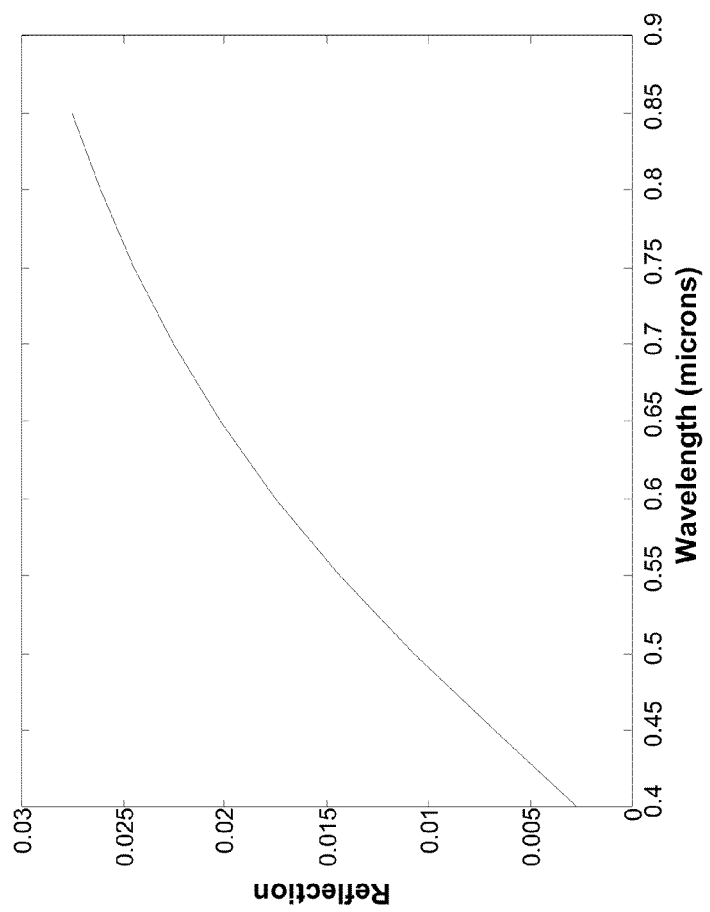
FIG. 3 is a plot of calculated reflectance as a function of wavelength of incident radiation for a glass article in which nanoparticles have been embedded in the surface of the glass article.

In some embodiments, antireflective layer 110 may be formed by embedding nanoparticles 112 to their "equator" (i.e., to a depth equivalent to one-half of the diameter of the nanoparticle) and then removing the portion of the nanoparticles that are not embedded (e.g., using an etching process). The reflectance, which is calculated using the effective index method and expressed as the fraction of light reflected from the antireflective layer of the glass article, for such an antireflective layer is plotted as a function of wavelength in FIG. 3.

In other embodiments, nanoparticles 112 are partially embedded in a binder 120 that is itself disposed on the surface 105 of the glass article 100 (FIG. 1c). Binder 120 may be applied to surface 105 by spin-coating, dip-coating, gravure printing, doctor blading, spray-coating, slot die coating, or the like to at least partially fill gaps 117 and obtain a nominally hexagonally packed geometry or array 115 similar to that shown in FIGS. 1a and 2. Binder 120 serves to secure, adhere, or bond nanoparticles 112 to surface 105, and may comprise an inorganic binder and/or an organo-silicon binder. Exemplary inorganic binders include an alkali metal silicate (e.g., sodium silicate), an alkali metal borate, or the like. Exemplary organo-silicon binders include a silsesquioxane (i.e., compounds having the empirical chemical formula RSiO$_{1.5}$, where R is either hydrogen or an alkyl, alkene, aryl, or arylene group), a siloxane (e.g., methyl siloxane, methyl phenyl siloxanes, phenyl siloxanes), or the like.

It is important to note that organic binders and, specifically, polymeric binders cannot serve as the binder for the articles and antireflective coatings described herein because of their low durability/stability to, and low compatibility with, the conditions to which the articles and coatings will be exposed during subsequent processing. For example, purely organic binders will not be able to withstand the temperatures and/or chemicals associated with chemical strengthening (e.g., ion exchange) of the glass substrate; nor will most purely organic binders permit an ion exchange process from occurring (i.e., many organic binders will not permit ions to diffuse or migrate therethrough). For at least these reasons, the antireflective coatings and glass articles described herein do not contemplate the use of purely organic binders.

The presence of gaps 117 between adjacent nanoparticles 112 provide antireflective layer 110—and glass article 100—with antireflective properties. Gaps 117 may be partially filled with binder 120, partially filled with air, or with a combination of binder 120 and air. In order to achieve the desired levels of reflectance, areas of surface 105 that are free of or having no particles should be minimized, as this allows light to pass through antireflective layer 110 and glass article 100. Accordingly, the standard deviation of gap 117 should be less than about twice the diameter d of nanoparticles 112. In some embodiments, gap 117 is less than or equal to about 300 nm (i.e. the average gap between nanoparticles, taken as a distance between their diameters, is less than or equal to about 300 nm) and, in other embodiments, gap 117 is less than or equal to about 100 nm. In some embodiments, adjacent nanoparticles are in direct contact with each other and the interparticle separation or gap 117 is zero.

The depth $d_1$ to which each of the plurality of nanoparticles 112 is embedded in either the surface 105 of the glass article 100 or binder 120 also affects the reflectance of antireflective layer 110. In some embodiments, the depth $d_1$ is less than about half (i.e., less than about 50%) of the diameter or major dimension d of nanoparticles 112. In other embodiments, the depth $d_1$ is less than about three eighths (i.e., less than about 37.5%) of the diameter d of nanoparticles 112 and, in still other embodiments, less than about one-fourth (i.e., less than about 25%) of diameter d.

Figure 4A:
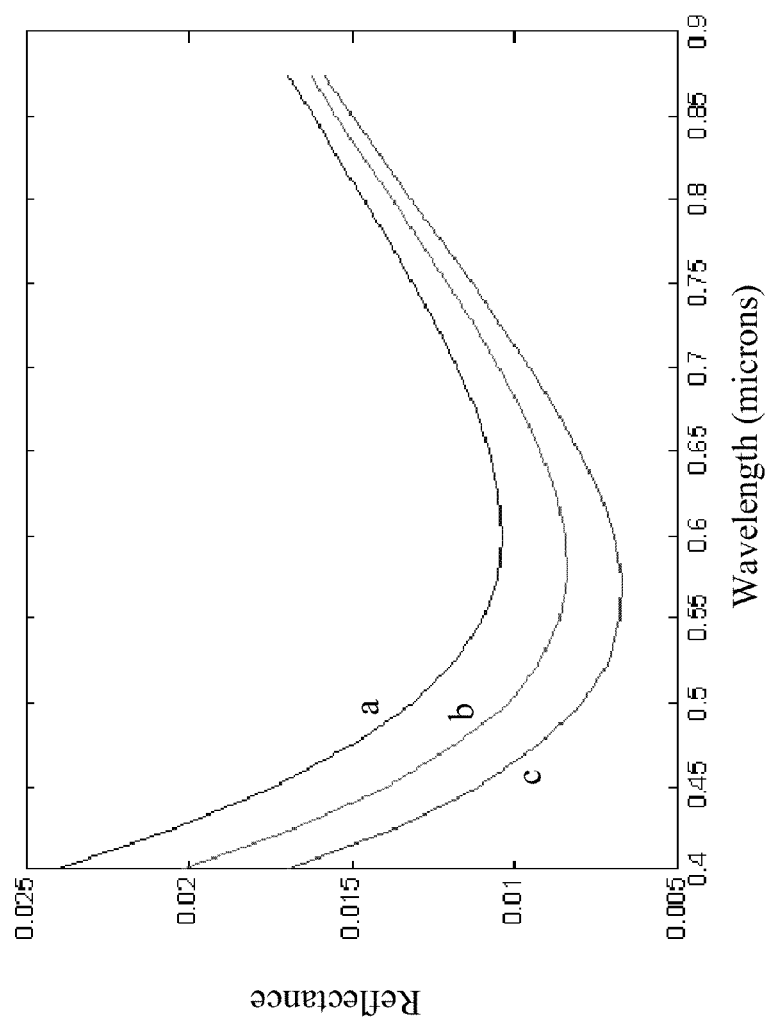
FIG. 4a is a plot of calculated reflectance of an antireflective layer as a function of wavelength of incident radiation for antireflective layers having different interparticle separations.

The wavelength at which the minimum reflectance occurs is dependent on particle size, binder depth $d_1$, and interparticle separation (i.e., gap 117). Reflectance curves calculated for antireflective surfaces comprising nanoparticles adhered to the surface 105 of the glass article 100 using an organic binder are plotted as a function of wavelength λ in FIGS. 4a-c, where reflectance is expressed as the fraction of light reflected from the antireflective surface of the glass article. Reflectance curves are calculated using the effective index method in which an effective index is calculated as a function of the depth of penetration for light propagating into and out of the surface coated with the antireflective layer. Once the index function is defined, the reflectance is calculated using a recursive formula. The effect of interparticle separation or spacing on reflectance for an antireflective layer comprising nanoparticles having a diameter 150 nm is shown in FIG. 4a. The nanoparticles are embedded in the binder to a depth $d_1$ of one-fourth (25%) of the nanoparticle diameter d (i.e., d/4). Reflectance was calculated for conditions where gap 117 is 0% (i.e., adjacent nanoparticles are in contact with each other) (shown as curve a in FIG. 4a), 5% (curve b in FIGS. 4a), and 10% (curve c in FIG. 4a) of the diameter of nanoparticles 112. As seen in FIG. 4a, reflectance decreases with increasing spacing. In addition, the wavelength at which minimum reflectance is obtained increases with decreasing spacing.

Figure 4B:
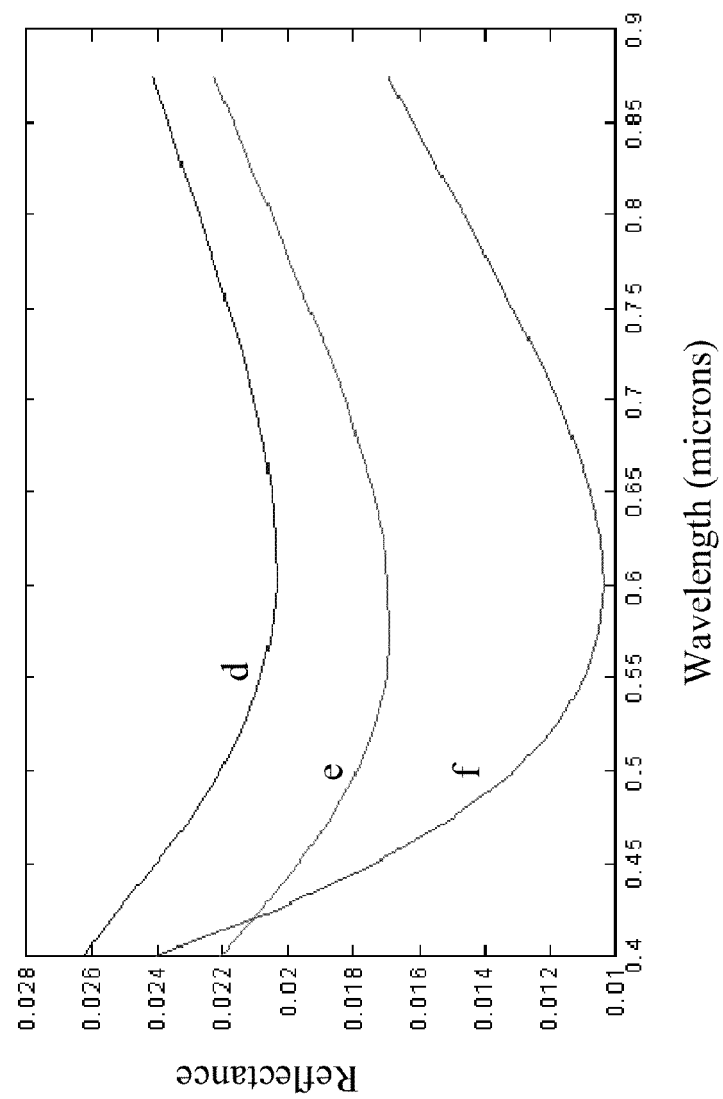
FIG. 4b is a plot of calculated reflectance of an antireflective layer as a function of wavelength of incident radiation for antireflective layers having different depths of binder.

The effect of binder depth (i.e., the depth to which the nanoparticles are embedded in the binder) on reflectance for antireflective surfaces comprising 150 nm nanoparticles that are in contact with each other (i.e., gap 117 is zero) is shown in FIG. 4b. Reflectance was calculated for binder depths of one-half (curve d in FIG. 4b), three-eighths (curve e in FIG. 4b), and one-fourth (curve f in FIG. 4b) of the diameter of nanoparticles 112. As seen in FIG. 4b, reflectance decreases with decreasing binder depth.

Figure 5:
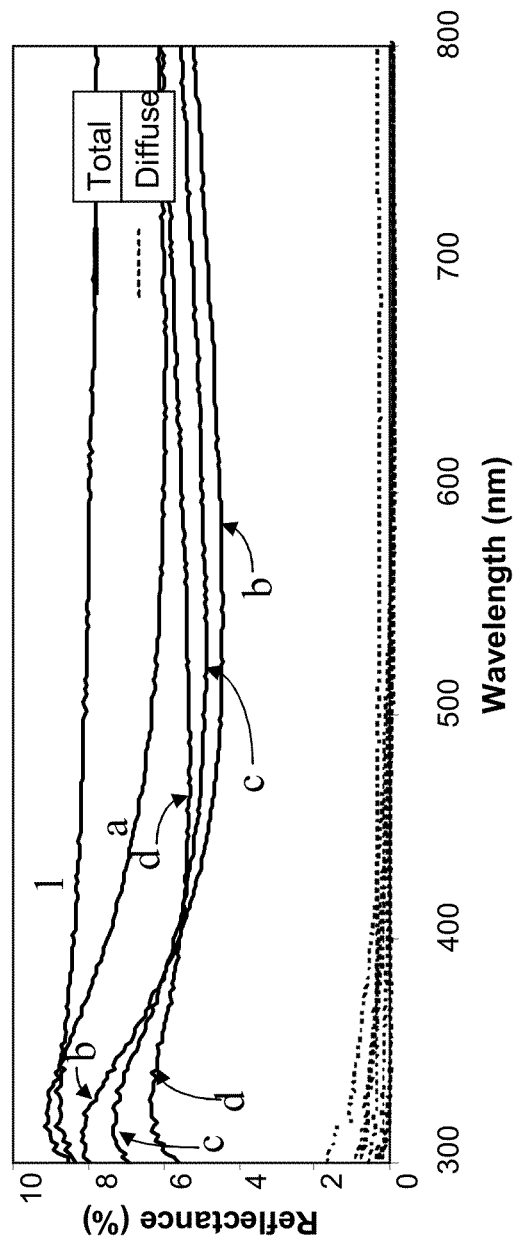
FIG. 5 is a plot of experimentally obtained total and diffuse reflectance curves as a function of wavelength for a control sample and surfaces having an antireflective layer on a single side.

Experimentally obtained reflectance curves for a control sample and surfaces having an antireflective layer on a single surface are plotted as a function of wavelength in FIG. 5, where reflectance is expressed as the percentage of light reflected from the antireflective surface. The control sample (curve 1 in FIG. 5) is a glass substrate having no antireflective layer having a reflectance of about 8%. The antireflective layers shown in curves a-d each comprise 100 nm nanoparticles. Curve a was obtained for an antireflective layer having no binder. Curves b-d comprise different amounts of sodium silicate binder. The amount of sodium silicate binder in the antireflective layer increases as the series progresses from curve b through curve d. The reflectance values in curves a-d include a 4% reflectance contribution from the back or opposite surface of the substrate, which did not have an antireflective layer. The reflectance of the antireflective layer alone can therefore be estimated by subtracting 4% from the values plotted in FIG. 5. The data plotted in FIG. 5 show that the reflection values increase with increasing binder depth. Also, the wavelength at which the minimum reflectance is observed shifts to lower wavelengths as the binder depth is increased, and is therefore in agreement with the theoretical calculations described hereinabove.

Figure 4C:
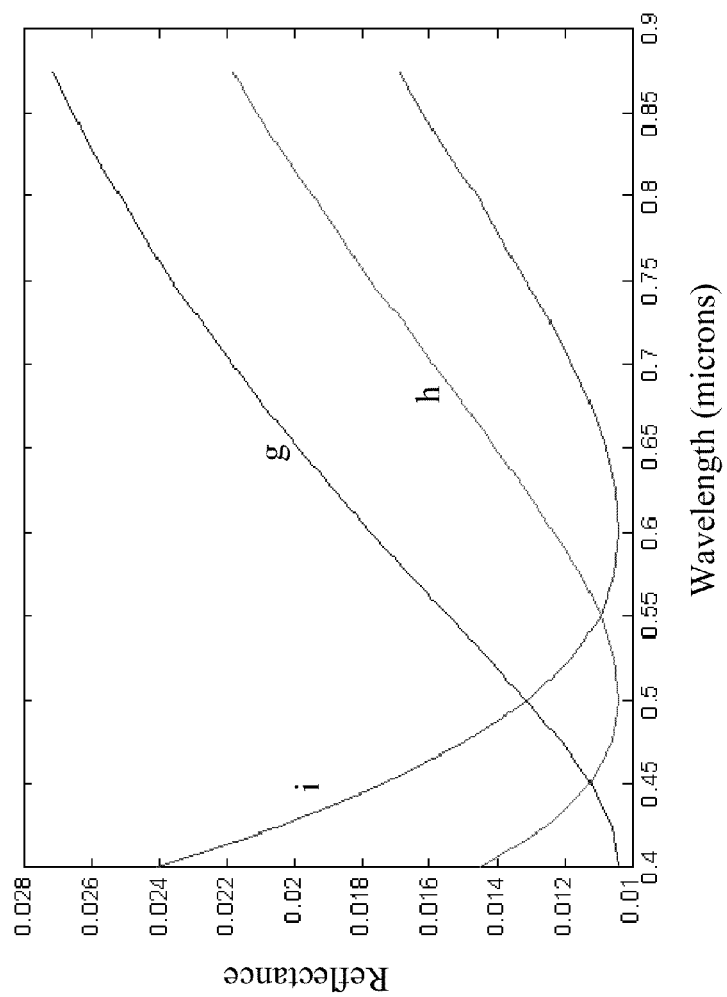
FIG. 4c is a plot of calculated reflectance of an antireflective layer as a function of wavelength of incident radiation for antireflective layers comprising nanoparticles of different sizes.

The effect of nanoparticle size on reflectance is shown in FIG. 4c. The data in FIG. 4c was calculated for antireflective layers or surfaces in which nanoparticles are in contact with each other and wherein the binder depth is ¼ of the diameter of the nanoparticles. Reflectance was calculated for nanoparticle sizes/diameters of 100 nm (curve g in FIG. 4c), 125 nm (curve h in FIGS. 4c), and 150 nm (curve i in FIG. 4c). As seen in FIG. 4c, the wavelength at which the minimum reflectance occurs increases with increasing nanoparticle size, while the value of the minimum reflectance is essentially unchanged by the size of the nanoparticles.

Figure 6A:
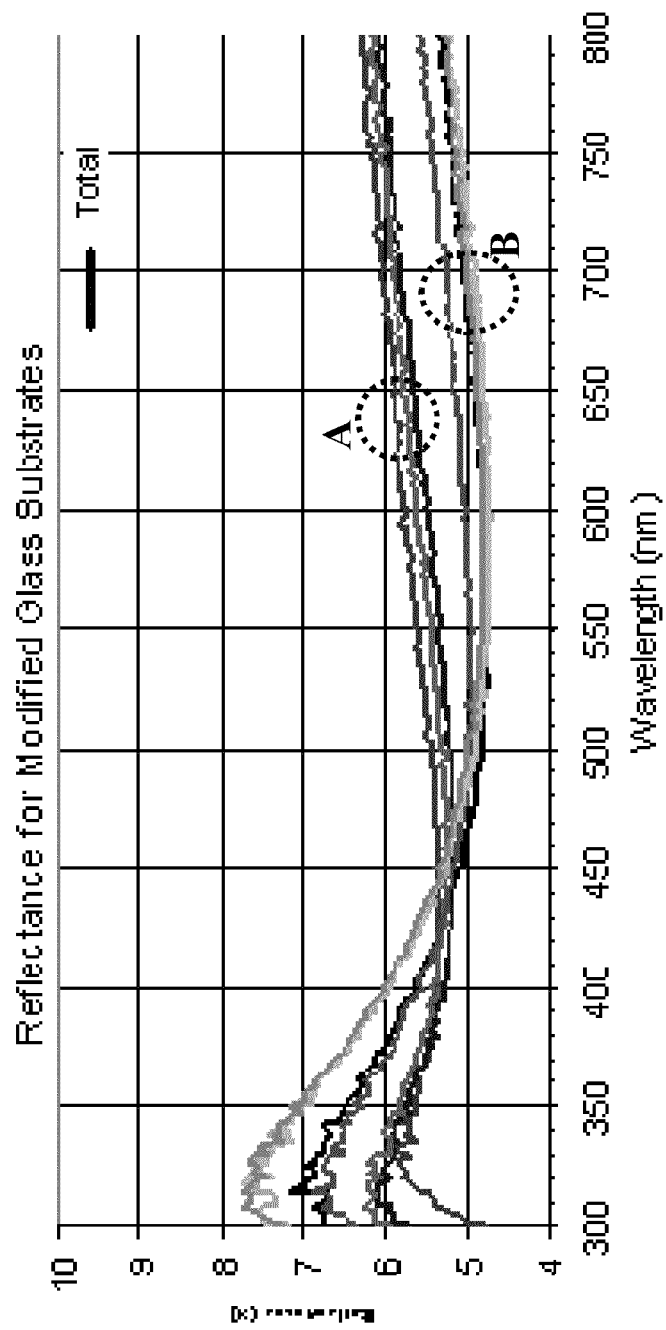
FIG. 6a is a first plot of experimentally obtained total and diffuse reflectance curves as a function of wavelength for antireflective layers comprising nanoparticles having a mean diameter of either 120 nm or 150 nm.
Figure 6B:
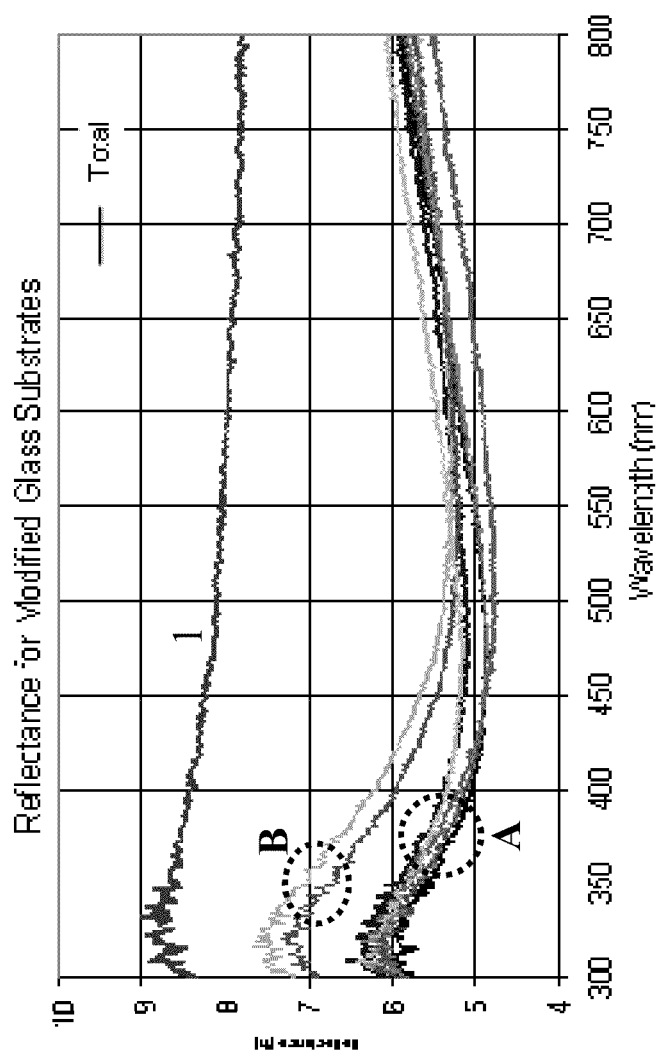
FIG. 6b is a second plot of experimentally obtained total and diffuse reflectance curves as a function of wavelength for antireflective layers comprising nanoparticles having a mean diameter of either 120 nm or 150 nm.

Experimentally obtained reflectance curves for a control sample and surfaces having an antireflective layer on a single surface are plotted as a function of wavelength in FIGS. 6a and 6b, where reflectance is expressed as the percentage of light reflected from the surface having the antireflective layer. The control sample (curve 1 in FIG. 6b) is a glass substrate having no antireflective layer, and has a reflectance of about 8%. The antireflective layers comprise nanoparticles having a mean diameter of either 120 nm (labeled group A in FIGS. 6a and 6b) or 150 nm (labeled group B in FIGS. 6a and 6b) and different depths of organic binder. The reflectance values in FIGS. 6a and 6b include a 4% reflectance contribution from the back or opposite surface of the substrate, which did not have an antireflective layer. The reflectance of the antireflective layer alone can therefore be estimated by subtracting 4% from the values plotted in FIGS. 6a and 6b. The data plotted in FIG. 6a show that the reflectance observed at 550 nm is less than or equal to about 1% when the antireflective surface comprises nanoparticles having a diameter of 150 nm.

Coating durability (also referred to as Crock Resistance) refers to the ability of the antireflective coating 110 to withstand repeated rubbing with a cloth. The Crock Resistance test is meant to mimic the physical contact between garments or fabrics with a touch screen device and to determine the durability of the coatings disposed on the substrate after such treatment.

A Crockmeter is a standard instrument that is used to determine the Crock resistance of a surface subjected to such rubbing. The Crockmeter subjects a glass slide to direct contact with a rubbing tip or "finger" mounted on the end of a weighted arm. The standard finger supplied with the Crockmeter is a 15 mm diameter solid acrylic rod. A clean piece of standard crocking cloth is mounted to this acrylic finger. The finger then rests on the sample with a pressure of 900 g and the arm is mechanically moved back and forth repeatedly across the sample in an attempt to observe a change in the durability/crock resistance. The Crockmeter used in the tests described herein is a motorized model that provides a uniform stroke rate of 60 revolutions per minute. The Crockmeter test is described in ASTM test procedure F1319-94, entitled "Standard Test Method for Determination of Abrasion and Smudge Resistance of Images Produced from Business Copy Products," the contents of which are incorporated herein by reference in their entirety.

Crock resistance or durability of the coatings, surfaces, and substrates described herein is determined by optical (e.g., reflectance, haze, or transmittance) measurements after a specified number of wipes as defined by ASTM test procedure F1319-94. A "wipe" is defined as two strokes or one cycle, of the rubbing tip or finger. In one embodiment, the reflectance of antireflective layer 110 of the glass article 100 described herein varies by less than about 20% after 100 wipes from an initial reflectance value measured before wiping. In some embodiments, after 1000 wipes the reflectance of antireflective layer 110 varies by less than about 20% from the initial reflectance value and, in other embodiments, after 5000 wipes the reflectance of antireflective layer 110 varies by less than about 20% from the initial reflectance value.

In some embodiments, the antireflective layer has a scratch resistance or hardness ranging from HB up to 9H, as defined by ASTM test procedure D3363-05.

In some embodiments, the glass article and antireflective layer described herein above, when placed in front of a pixelated display comprising a plurality of pixels, exhibits no sparkle. Display "sparkle" or "dazzle" is a generally undesirable side effect that can occur when introducing light scattering surfaces into a pixelated display system such as, for example, a liquid crystal display (LCD), an organic light emitting diode (OLED) display, touch screen, or the like, and differs in type and origin from the type of "sparkle" or "speckle" that has been observed and characterized in projection or laser systems. Sparkle is associated with a very fine grainy appearance of the display, and may appear to have a shift in the pattern of the grains with changing viewing angle of the display. Display sparkle may be manifested as bright and dark or colored spots at approximately the pixel-level size scale.

The degree of sparkle may be characterized by the amount of transmission haze exhibited by the glass article and the antireflective layer As used herein, the term "haze" refers to the percentage of transmitted light scattered outside an angular cone of about ±2.5°, in accordance with ASTM procedure D1003. Accordingly, in some embodiments, the antireflective layer has a transmission haze of less than about 1%.

Table 1 lists hardness, transmission, haze, and reflectance values for antireflective layers as described hereinabove disposed on a single surface of an alkali aluminosilicate glass substrate. The antireflective layers comprised silica nanoparticles having a diameter of either 120 nm or 150 nm and either an organic or organo-silicon binder. The surface of the glass substrate was first spin-coated with a primary layer comprising an aqueous dispersion of 1-5% silica nanoparticles by weight. Monolayer coatings of the nanoparticles were achieved by varying the concentration of nanoparticles in the dispersion, ramp speed, spin speed, or the like.

After the primary layer was dried, the surface of the glass substrate was dip-coated with a secondary layer comprising the binder. In some samples, the organo-silicon binder comprised a solution of 25% hydrogen silsesquioxane (FOX-14, supplied by Dow Corning) by weight in methylisobutylketone (MIBK). In other samples, the organo-silicon binder comprised a solution of 25-50% by weight of a stock solution of a methyl siloxane binder in isopropyl alcohol. Non-limiting examples of such binders include ACCUGLASS® 111, 211, 311, 512B methyl siloxane spin-on polymers or the like, manufactured by Honeywell International, Inc. The thickness of the secondary binder layer could be varied by varying binder concentration, dip withdrawal speed, and coating time. Following coating with the secondary layer, the samples were heated at a temperature ranging from 300° C. to 315° C. for about one hour. Alternatively, some of the organo-silicon binder-coated samples were heated to greater than or equal to about 500° C. for about one hour to remove any organic functionality from the binder layer. As will be described below with respect to methods for making such articles, some of the glass samples were ion-exchanged after the heat treatment.

Table 1 also includes: a sample (sample A in Table 1) having an antireflective layer that was formed by heating the glass substrate and 100 nm diameter nanoparticles to a temperature that was greater than the anneal point of the glass and allowing the nanoparticles to sink into—and embed in—the surface of the glass; a first control sample having a commercially available DNP antireflective film (sample B in Table 1); and a second control sample that is uncoated (sample C in Table 1).

The reflectance values listed in Table 1 include a 4% reflectance contribution from the back or opposite surface of the glass substrate, which did not have an antireflective layer. The reflectance of the antireflective layer alone can therefore be estimated by subtracting 4% from the values listed in Table 1.

TABLE 1

Properties of antireflective layers on alkali aluminosilicate glass substrates.

| Sample | Primary Monolayer Nanoparticle Size | Secondary Layer | Transmittance (%)* | Haze (%)* | Pencil Hardness | Total Reflection (%) @450 nm | Total Reflection (%) @550 nm | Total Reflection (%) @650 nm |
|---|---|---|---|---|---|---|---|---|
| 1 | 120 nm | 25% T111 in IPA[1] | 96.9 | .18 | HB | 4.9 | 5.0 | 5.0 |

TABLE 1-continued

Properties of antireflective layers on alkali aluminosilicate glass substrates.

| Sample | Primary Monolayer Nanoparticle Size | Secondary Layer | Transmittance (%)* | Haze (%)* | Pencil Hardness | Total Reflection (%) @450 nm | Total Reflection (%) @550 nm | Total Reflection (%) @650 nm |
|---|---|---|---|---|---|---|---|---|
| 2 | 120 nm | 25% T111 in IPA[1] | 96.8 | .23 | HB | 4.9 | 5.0 | 5.0 |
| 3 | 120 nm | 50% T111 in IPA[1] | 96.7 | .17 | 3H | 5.2 | 5.3 | 5.3 |
| 4 | 120 nm | 25% Fox-14 in MIBK[2] | 96.8 | .25 | HB | 5.2 | 5.3 | 5.7 |
| 5 | 120 nm | 50% T111 in IPA | 96.6 | .19 | 3H | 5.3 | 5.5 | 5.8 |
| 6 | 120 nm | 25% T111 in IPA[1] | 96.7 | .23 | HB | 4.9 | 5.0 | 5.0 |
| 7 | 120 nm | 50% T111 in IPA[1] | 96.9 | .21 | HB | 5.2 | 5.2 | 5.2 |
| 8 | 150 nm | 25% T111 in IPA | 97.1 | .39 | HB | 5.4 | 4.8 | 4.9 |
| 9 | 150 nm | 25% T111 in IPA[1] | 97.1 | .33 | HB | 5.3 | 4.7 | 4.8 |
| 10 | 150 nm | 50% T111 in IPA[1] | 97 | .28 | HB | 5.2 | 4.9 | 5.1 |
| 11 | 150 nm | 25% Fox 14 in MIBK[2] | 97 | .4 | HB | 5.1 | 4.7 | 4.9 |
| 12 | 150 nm | 25% T111 in IPA[1] | 97.1 | .28 | HB | 5.3 | 4.8 | 4.8 |
| 13 | 150 nm | 50% T111 in IPA[1] | 96.5 | .39 | HB | 5.6 | 5.2 | 5.2 |
| 14 | 150 nm | 100% T111 in IPA[1] | 96.4 | .34 | 1H | 5.7 | 5.3 | 5.3 |
| 15 | 150 nm | 25% Fox-14 in MIBK[2] | 96.6 | .47 | 3H | 4.9 | 4.8 | 4.8 |
| A | 100 nm | None | | | | 5.4 | 5.6 | 5.9 |
| B DNP (control) | | | 96.7 | .21 | HB | 5.6 | 4.9 | 4.9 |
| C Glass (control) | | | | | | 8.3 | 8.0 | 8.0 |

*Haze Guard plus transmittance and Haze values.
[1]T111 in IPA = ACCUGLASS ® 111 methyl siloxane stock solution in isopropyl alcohol
[2]Fox-14 in MIBK = Fox-14 hydrogen silsesquioxane in methylisobutylketone.

The transparent glass articles described herein can comprise, in various embodiments, a soda lime glass, a borosilicate glass, an alkali aluminosilicate glass, or an alkali aluminoborosilicate glass. In one embodiment, the transparent glass article comprises an alkali aluminoborosilicate glass that comprises alumina, at least one alkali metal and, in some embodiments, greater than 50 mol %, $SiO_2$, in other embodiments, at least 58 mol %, and in still other embodiments, at least 60 mol % $SiO_2$, wherein the ratio $$\frac{Al_2O_3(\text{mol \%}) + B_2O_3(\text{mol \%})}{\sum \text{alkali metal modifiers (mol \%)}} > 1,$$

where the modifiers are alkali metal oxides. This glass, in particular embodiments, comprises, consists essentially of, or consists of: about 58 mol % to about 72 mol % $SiO_2$; about 9 mol % to about 17 mol % $Al_2O_3$; about 2 mol % to about 12 mol % $B_2O_3$; about 8 mol % to about 16 mol % $Na_2O$; and 0 mol % to about 4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the modifiers are alkali metal oxides.

In another embodiment, the transparent glass article comprises an alkali aluminosilicate glass comprising, consisting essentially of, or consisting of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO.

In yet another embodiment, the transparent glass article comprises an alkali aluminosilicate glass comprising, consisting essentially of, or consisting of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol %≤$Li_2O+Na_2O+K_2O$≤20 mol % and 0 mol %≤MgO+CaO≤10 mol %.

In still another embodiment, the transparent glass article comprises an alkali aluminosilicate glass comprising, consisting essentially of, or consisting of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)−$Al_2O_3$≥2 mol %; 2 mol %≤$Na_2O$−$Al_2O_3$≤6 mol %; and 4 mol %≤($Na_2O$+$K_2O$)−$Al_2O_3$≤10 mol %.

In other embodiments, the transparent glass article comprises $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3$+$B_2O_3$. In some embodiments, [($P_2O_5$ (mol %)+$R_2O$ (mol %))/$M_2O_3$ (mol %)]=1 and, in some embodiments, the glass does not include $B_2O_3$ and $M_2O_3$=$Al_2O_3$. The glass comprises, in some embodiments: about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In some embodiments, the glass comprises: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. The glass may further comprise at least one alkaline earth metal oxide such as, but not limited to, MgO or CaO.

In some embodiments, the transparent glass article is free of lithium (i.e., the glass comprises no intentionally added $Li_2O$, even though it may be present in trace amounts as an impurity). In some embodiments, the glass comprises less than 1 mole percent (mol %) $Li_2O$ and, in other embodiments, less that 0.1 mol % $Li_2O$. In some embodiments, such glasses are free of at least one of arsenic, antimony, and barium (i.e., the glass comprises no intentionally added $As_2O_3$, $Sb_2O_3$, and BaO, even though they may be present in trace amounts as impurities).

In some embodiments, the transparent glass article comprises a glass substrate that can be strengthened by either chemical or thermal means that are known in the art. In one embodiment, the transparent glass substrate is an ion exchangeable glass that is chemically strengthened by ion exchange. In this process, metal ions at or near a surface of the glass are exchanged for larger metal ions having the same valence as the metal ions in the glass. The exchange is generally carried out by contacting the glass with an ion exchange medium such as, for example, a molten salt bath that contains the larger metal ion. The metal ions are typically monovalent metal ions such as, for example, alkali metal ions. In one non-limiting example, chemical strengthening of a glass substrate containing sodium ions by ion exchange is accomplished by immersing the glass substrate in an ion exchange bath comprising a molten potassium salt such as potassium nitrate ($KNO_3$) or the like.

The replacement of small metal ions by larger metal ions in the ion exchange process creates in a region in the glass that extends from the surface to a depth (also referred to as the "depth of layer") that is under compressive stress. This compressive stress at the surface of the transparent glass substrate is balanced by a tensile stress (also referred to as "central tension") within the interior of the glass substrate. In some embodiments, the surface of the transparent glass substrate described herein, when strengthened by ion exchange, has a compressive stress of at least 350 MPa, and the region under compressive stress extends to a depth of layer of at least 15 µm below the surface.

Figure 7:
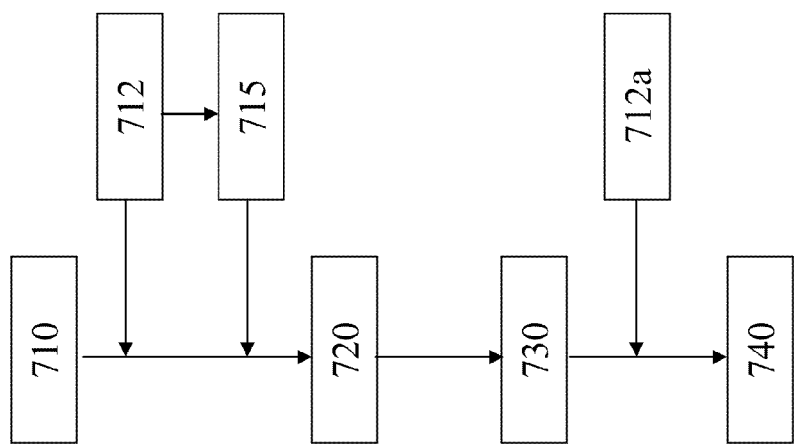
FIG. 7 is a flow chart representing a method of making a glass article having an antireflective layer.

In another aspect, methods of making the antireflective layer and the glass article having the antireflective layer, both of which are described hereinabove, are also provided. A flow chart representing a method 700 of making the glass articles having the antireflective layers is shown in FIG. 7. In an optional first step 710 of method 700, a transparent glass substrate is first provided. The glass substrate may, in various embodiments, comprise a soda lime glass, a borosilicate glass, an alkali aluminosilicate glass, or an alkali aluminoborosilicate glass as previously described hereinabove. The glass substrate may be formed by those methods known in the art, including, but not limited to, float techniques, molding, casting, and down draw methods, such as slot draw, fusion draw, or the like.

In step 720, a plurality of nanoparticles is self-assembled into a nominally hexagonally packed monolayer on a surface of the glass article. As previously described hereinabove, the nanoparticles may comprise polymeric particles, inorganic oxides or fluorides (e.g., of cerium, zirconium, aluminum, titanium, magnesium, silicon, or the like), or the like, combinations thereof, or mixtures thereof, and may be essentially spherical in shape, nearly spherical, ellipsoidal, polygonal, or conical. The plurality of nanoparticles has a mean diameter in a range from about 80 nm to about 200 nm and, in some embodiments, from about 80 nm to about 180 nm. Adjacent nanoparticles may, as previously described hereinabove, be separated from each other by a gap or be in contact with each other. Self assembly may, in some embodiments, take place by coating the surface of the glass substrate with a dispersion comprising the nanoparticles using means such as, but not limited to, spin-coating, dip-coating, gravure printing, doctor blading, spray-coating, slot die coating, or the like. For example, a primary silica nanoparticle layer can be formed by dip and/or spin coating the substrate using 1-5 wt % silica nanoparticle/water or isopropyl alcohol dispersion followed by drying. Monolayer coatings may be obtained by varying the nanoparticle concentration in the dispersion, withdrawal speed of the substrate, spin speed, and the like. After drying of the primary layer, the binder layer is dip coated onto the surfaces.

The self-assembled nanoparticles can then be subjected to an embedding step (step 730) to form the antireflective layer (step 740). In one scenario, the embedding step (step 730) involves the self-assembled nanoparticles being partially embedded in the surface of the glass substrate itself For example, the glass substrate and the nanoparticles are heated to a temperature that is greater than the anneal point of the glass substrate, and a portion of the nanoparticles sinks into the substrate. While the nanoparticles may in some instances sink into the surface under their own weight, a force may be applied to either the glass substrate or the nanoparticles to embed them in the glass substrate.

In another scenario of the embedding step (730), the nanoparticles are partially embedded in a binder. Such binders include those inorganic and/or organo-silicon binders previously described hereinabove, and may be applied to the surface of the glass substrate by spin-coating, dip-coating, gravure printing, doctor blading, spray-coating, slot die coating, or the like.

In some embodiments, the inorganic binder is a soluble silicate (i.e., a water soluble glass comprising an alkali metal and silica $SiO_2$). Non-limiting examples of such soluble glasses include sodium silicates in which the ratio $SiO_2$:$Na_2O$ is in a range from about 2.00 to about 3.22, with $SiO_2$/$Na_2O$ ratios of greater than or equal to about 2.5 and providing better nanoparticle adhesion to the surface of the substrate.

In step 730, the nanoparticles are partially embedded in the surface of the glass substrate or the binder to a depth that is less than about half (i.e., less than about 50%) of the diameter or major dimension of the nanoparticles. In other embodiments, the depth is less than about three-eighths (i.e., less than about 37.5%) of the diameter of the nanoparticles and, in still other embodiments, less than about one-fourth (i.e., less than about 25%) of the diameter.

As previously described hereinabove, the resulting antireflective surface (step 740) has a reflectance of less than about 2% at wavelengths in a range from about 450 nm to about 1000 nm and, in some embodiments, a reflectance of less than about 1.5% for radiation having wavelength λ in a range from about 450 nm to about 700 nm. In addition, the antireflective layer may have a transmission haze of less than about 1% and, when, placed in front of a pixelated display, exhibit no sparkle.

In some embodiments, method 700 optionally includes ion exchanging the glass substrate (steps 712, 712a), as previously described herein. In those instances where the plurality of nanoparticles is embedded in an organic binder, the glass substrate is ion exchanged prior to self-assembly of the plurality of nanoparticles (step 720). In those instances where the plurality of nanoparticles is embedded in an inorganic binder, the glass substrate may be ion exchanged either prior to (step 712) self-assembly of the plurality of nanoparticles (step 720) or following (step 712a) the step of embedding the nanoparticles in the binder (step 730). In those embodiments where the nanoparticles are directly embedded in the glass substrate as described hereinabove, the glass substrate is ion exchanged after (step 712a) the nanoparticles are embedded in the surface of the glass substrate (step 730).

In some embodiments, method 700 further includes etching the surface of the glass substrate (step 715). Such etching is carried out to improve the resistance of the glass article or substrate to impact damage, and is performed prior to self-assembling the plurality of nanoparticles. In some embodiments, etching (step 715) may follow ion exchange (step 712). In one embodiment, the surface of the glass substrate is etched with a solution of 5% HF and 5% $H_2SO_4$. Such etching is described in U.S. patent application Ser. No. 12/986,424 filed on Jan. 7, 2011, by James J. Price et al., entitled "Impact-Damage-Resistant Glass Sheet," which claims priority from U.S. Provisional Application No. 61/293,032 filed on Jan. 7, 2010, the contents of which are incorporated by reference herein in their entirety. In some embodiments, etching step 715 follows ion exchange step 712.

A method of making an antireflective layer on a glass substrate is also provided. The method comprises self-assembling a plurality of nanoparticles into a nominally hexagonally packed monolayer and partially embedding the self-assembled nanoparticles in the surface of a substrate or in a binder that is disposed on the surface of the substrate to form the antireflective layer. The steps of self-assembling and embedding the plurality of nanoparticles in a surface have been previously described hereinabove.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A transparent glass article, comprising:
a glass substrate; and
an antireflective layer having a total reflectance of less than about 2% at wavelengths in a range from about 450 nanometers to about 1000 nanometers disposed on a surface of the glass substrate;
wherein the antireflective layer comprises a plurality of nominally hexagonally packed nanoparticles disposed in a monolayer on the surface of the glass substrate, wherein at least a portion of the plurality of nominally hexagonally packed nanoparticles are separated from each other by a gap.

2. The transparent glass article of claim 1, wherein at least a portion of the plurality of nominally hexagonally packed nanoparticles is partially embedded in the surface of the glass substrate.

3. The transparent glass article of claim 2, wherein each nanoparticle of the at least the portion of the plurality of nominally hexagonally packed nanoparticles is embedded in the surface of the glass substrate to a depth of less than about one half of its diameter.

4. The transparent glass article of claim 1, further comprising an inorganic and/or organo-silicon binder disposed on the surface of the glass substrate, wherein at least a portion of the plurality of nominally hexagonally packed nanoparticles is partially embedded in the inorganic and/or organo-silicon binder.

5. The transparent glass article of claim 4, wherein each nanoparticle of the at least the portion of the plurality of nominally hexagonally packed nanoparticles is embedded in the inorganic and/or organo-silicon binder to a depth of less than about one half of its diameter.

6. The transparent glass article of claim 4, wherein the inorganic and/or organosilicon binder comprises a silsesquioxane, a methyl siloxane, a methyl phenyl siloxane, a phenyl siloxane, an alkali metal silicate, an alkali metal borate, or a combination thereof.

7. The transparent glass article of claim 1, wherein the plurality of nominally hexagonally packed nanoparticles has an average diameter of about 80 nanometers to about 200 nanometers.

8. The transparent glass article of claim 1, wherein the antireflective layer has a transmission haze of less than about 1%.

9. The transparent glass article of claim 1, wherein the glass substrate is chemically strengthened by ion exchange resulting in the surface having a compressive layer under compressive stress that extends from the surface to a depth within in the glass, wherein the compressive stress is at least 350 megaPascals and the depth of layer of the compressive layer is at least 20 micrometers.

10. The transparent glass article of claim 1, wherein the transparent glass article, when placed in front of a display comprising a plurality of pixels, exhibits no sparkle.

11. The transparent glass article of claim 1, wherein the antireflective layer has a reflectance after 5,000 wipes that varies by less than about 20% from an initial reflectance of the antireflective layer measured before wiping.

12. The transparent glass article of claim 1, wherein the antireflective layer has a hardness ranging from HB up to 9H.

13. A method of making an antireflective layer on a glass substrate, the method comprising:
self-assembling a plurality of nanoparticles in a nominally hexagonally packed monolayer on a surface of the glass substrate, wherein at least a first portion of the plurality of nominally hexagonally packed nanoparticles are separated from each other by a gap; and
partially embedding at least a second portion of the plurality of nanoparticles in the surface of the glass substrate or in a binder to form the antireflective layer, wherein the binder is an inorganic and/or organo-silicon binder, and wherein the antireflective layer has a reflectance of less than about 2% at wavelengths in a range from about 450 nanometers to about 1000 nanometers.

14. The method of claim 13, wherein self-assembling the plurality of nanoparticles comprises applying a dispersion comprising the plurality of nanoparticles to the surface of the glass substrate by spin-coating, dip-coating, gravure printing, doctor blading, spray-coating, slot die coating, or a combination thereof.

15. The method of claim 13, wherein partially embedding the at least the second portion of the plurality of nanoparticles in the surface of the glass substrate comprises heating the glass substrate and/or the at least the second portion of the plurality of nanoparticles at a temperature above an anneal point of the glass substrate such that a portion of the nanoparticles of the at least the second portion of the plurality of nanoparticles sinks into the surface of the glass.

16. The method of claim 13, wherein partially embedding the at least the second portion of the plurality of nanoparticles in the inorganic and/or organo-silicon binder comprises disposing the inorganic and/or organo-silicon binder on the surface of the glass substrate and into spaces between the nanoparticles of the at least the second portion of the plurality of nanoparticles.

17. The method of claim 13, wherein each nanoparticles of the at least the second portion of the plurality of nanoparticles is embedded in the inorganic and/or organo-silicon binder to a depth of less than about one half of its diameter.

18. The method of claim 13, further comprising 10 n exchanging the glass substrate such that the surface of the glass substrate has a compressive layer under compressive stress that extends from the surface to a depth within in the glass substrate, wherein the compressive stress is at least 350 megaPascals and the depth of layer of the compressive layer is at least 20 micrometers.

19. The method of claim 18, wherein ion exchanging is performed after partially embedding the at least the second portion of the plurality of nanoparticles in the surface of the glass substrate or in the binder.

20. The method of claim 13, further comprising etching the surface of the glass substrate before self-assembling.

* * * * *